US006876967B2

(12) United States Patent
Goto et al.

(10) Patent No.: US 6,876,967 B2
(45) Date of Patent: Apr. 5, 2005

(54) SPEECH COMPLEMENTING APPARATUS, METHOD AND RECORDING MEDIUM (75) Inventors: Masataka Goto, Tsukuba (JP); Katunobu Itou, Tsukuba (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 516 days.

(21) Appl. No.: 09/749,743

(22) Filed: Dec. 28, 2000

(65) Prior Publication Data

US 2002/0007275 A1 Jan. 17, 2002

(30) Foreign Application Priority Data

| Jul. 13, 2000 | (JP) | ........................................ | 2000-212158 |
| Dec. 14, 2000 | (JP) | ......................................... | 2000-38078 |

(51) Int. Cl.[7] .............................................. G10L 15/00
(52) U.S. Cl. ....................................... 704/254; 704/257
(58) Field of Search ................................ 704/251, 254, 704/257, 249

(56) References Cited

U.S. PATENT DOCUMENTS 5,884,259 A * 3/1999 Bahl et al. ................... 704/252
6,484,141 B1 * 11/2002 Tomoeda ..................... 704/254

FOREIGN PATENT DOCUMENTS

| JP | 10-222337 A | 8/1998 |
| JP | 11-95793 A | 4/1999 |
| JP | 11095793 A * 4/1999 | ............. G01L/3/00 |
| JP | 11-305768 | 10/1999 |

OTHER PUBLICATIONS

O'Shaughnessy, D. et al., "Automatic indentification of filled pauses in spontaneous speech, " 2000 Canadian Conference on Electrical and Computer Engineering, vol.2, Mar. 7–10, 2000, pp. 620–624.*

Fukushima and Yamada, "A Predictive Pen–Based Japanese Text Input Method and Its Evaluation", Transactions of the Information Processing Society of Japan, vol. 37, No. 1, pp. 23–30 (1996).

Masui, "An Effcient Text Input Method for Pen–based Computers", Proceedings of the ACM Conference on Human Factors in Computing Systems (CHI'98), pp. 328–335, (1998).

Masataka Goto et al. "Speech Completion: TAB on Speech", Transactions of Information Processing Society of Japan, 200–SLP–32–116, vol. 2000, No. 64, pp. 81–86 Jul. 2000.

Masataka Goto et al., "2–Q–10 Speech Completion: New Speech Input Interface Supporting Word Completion", ETL.

Masataka Goto et al. "Speech Completion: Introducing New Mofdality Into Speech Input Interface", WISS 2000, pp. 153–162.

(Continued)

Primary Examiner—Susan McFadden
(74) Attorney, Agent, or Firm—Venable LLP; Michael A. Sartori (57) ABSTRACT

An apparatus that recognizes inputted speech and complements the result of the speech recognition just before a filled pause when the filled pause is detected.

22 Claims, 10 Drawing Sheets

OTHER PUBLICATIONS

Masataka Goto et al. "A Real–Time System Detecting Filled Pauses in Spontaneous Speech", The Transactions of the institute of Electronics, Information and Communication Engineers D–II, vol. J83–D–II, No. 11, pp. 2330–2340, Nov. 2000.

Masataka Goto et al. , "Evaluation of A Real–Time Filled Pause Detection System", Acoustical Science and Technology, 3–8–8, pp. 81–82 Mar. 2000.

Masataka Goto et al. , "A Real–Time Filled PauseDetection System: Toward Spontaneous Speech Dialougue", Acoustical Science and Technology, pp. 187–192.

Masataka Goto et al. , "Real–Time Detection of Filled Pauses in Spontaneous Speech", Acoustical Science and Technology, 3–1–5, pp. 105–106, Oct. 1999.

Masataka Goto et al., "A Real–Time Filled Pause Detection System for Spontaneous Speech Recognition" ESCA, Eurospeech 99, Budapest, Hungary, ISSN 1018–4074, pp. 227–230.

Masataka Goto et al., "A Real–Time System Detecting Filled Pauses in Spontaneous Speech", Transactions of Information Processing Society of Japan, pp. 9–16.

Masataka Goto, "A Real–time System Detecting Filled Pauses in Spontaneous Speech", Electrotechnical Laboratory, 99–SLP–27–2, vol. 99, No. 64, pp. 9–16, (Jul. 1999).

* cited by examiner

SPEECH COMPLEMENTING APPARATUS, METHOD AND RECORDING MEDIUM

This application is based on Japanese Patent Application Nos. 2000-212158 filed Jul. 13, 2000 and 2000-380781 filed Dec. 14, 2000, the contents of which are incorporated hereinto by reference.

BACKGROUND OF THE INVENTION

1. Field of the Invention

The present invention relates to an apparatus, a method and a recording medium generally applied in the speech recognition.

2. Description of the Related Art

One reason for the fact that the oral communication is an excellent means for human beings to exchange information is that a listener can help a speaker's speech act or concept forming. In the human speech dialog, therefore, even when the speaker stumbles in his speech, the listener may guess what the speaker intends to say and suggest some candidates helping the speaker remember what he has intended to say. For example, when the speaker cannot remember the word "speech complementing" and stumbles (hesitates) saying "speech, er . . . ", the listener can help the speaker by asking whether he intended to say "speech complementing?". In this process, the listener presents a candidate for the word the speaker has intended to say by complementing the fragment of the word the speaker has uttered. Hence, this process may be regarded as word complementing.

The concept of complementing has been widely applied to text interfaces. For example, several text editors (e.g., Emacs and Mule) and UNIX shells (e.g., tcsh and bash) provide the complementing function (called "completion") for file names and command names. In such a function, when the user presses a key (typically the Tab key) to call the complementing function (hereinafter referred to as "complementing trigger key"), the remaining portion of the fraction of a word that has been typed halfway is complemented. In WWW browsers such as Netscape Communication and Internet Explorer also, the automatic complementing function (called "autocompletion") for URLs has been introduced, wherein the system provides lists of complementing candidates one after another while the user is typing.

Recently, the complementing function has been introduced into pen-based interfaces. For example, interfaces with automatic complementing functions such as a predictive pen-input interface and POBox have been proposed. (As for the predictive pen-input, refer to Toshikazu FUKUSHIMA and Hiroshi YAMADA, "A Predictive Pen-Based Japanese Text Input Method and Its Evaluation", Transactions of Information Processing Society of Japan, Vol. 37, No. 1, pp. 23–30 (1996); for POBox, refer to Masui, T., "An efficient Text Input Method for Pen-based Computers," Proceedings of the ACM Conference on Human Factors in Computing Systems (CHI '98), pp. 328–335, 1998).

For a speech input interface, however, the speech complementing input has not been realized because there has been no appropriate means for calling the complementing function while the speech is being inputted.

SUMMARY OF THE INVENTION

An object of the present invention is to provide speech complementing apparatus, a method and a recording medium that can complement speech inputted.

The present invention has enabled to provide a better speech input interface mainly operated by speech recognition by introducing a speech input interface function (hereinafter referred to as "speech complementing" or "speech completion"), which enables a system to complement an uttered speech even when a user speaks only fragments of words without all information that the user has intended to input during the speech is being inputted to the system.

In order to realize the speech complementing, there are two possible methods as in the case of text complementing. One is complementing by the complementing trigger key and another is automatic complementing wherein complementing candidates are presented in succession during the user's utterance. However, in the attempt to complement the speech automatically, it is unlikely that the system can present appropriate candidates in succession with the same accuracy as provided for the text complementing because the fragment of speech is very ambiguous for the system to recognize. Therefore, it is very possible that the automatic complementing function itself gets confused too much. Hence, the automatic complementing does not seem to be applicable to the speech complementing, and it becomes important for the speech complementing that the complementing function can be called intentionally and effortlessly by the user when the user wants to see the complementary candidates. The key to realize an easy-to-use speech complementing function lies in how the complementing function can be called, in other words, what kind of complementing trigger key should be used in the speech complementing application.

According to the present invention, it is made possible for the user to call the complementing function, when desired, without any particular effort by assigning the filled pause, which is a phenomenon of stumbling (one of hesitation phenomena), the role of complementing trigger key. Filled pauses are classified into two groups which are fillers (transition words) and word lengthening (prolongation of syllables). Here the filled pauses mean the prolongation of vowels during both of fillers and word lengthening. Fillers in Japanese such as "eh . . . ", "uhm . . . ", "ah . . . ", "maa . . . ", "nnn . . . ", ano- . . . ", "sono- . . . ", "kono- . . . ," etc., and fillers in English such as "er . . . ", "erm . . . ", "uh . . . ", "um . . . ," etc. include the filled pauses. It is quite a natural behavior for human beings to utter filled pauses during speech input, which can be utilized as the complementing trigger key. In fact, the filled pause plays a similar role in human conversation. A Speaker often stalls for time with a filled pause to remember the next word, or sometimes utilizes a filled pause expecting help from the listener.

The above and other objects, effects, features and advantages of the present invention will become more apparent from the following description of embodiments thereof taken in conjunction with the accompanying drawings.

DETAILED DESCRIPTION OF THE PREFERRED EMBODIMENTS

Two embodiments according to the present invention are described below.
(1) Speech Forward Complementing: Speech Complementing Method Using a Filled Pause In the first method, by assigning the filled pause, which is a phenomenon of stumbling (one of hesitation phenomena), the role of complementing trigger key, it is made possible for the user to call the complementing function, when desired, without any particular effort.

When the phrase "onsei hokan (in English, speech complementing)" is registered in the dictionary of speech recognition, for example, the filled pause such as prolongation of the vowel "i" like "onsei-" ("-" indicates a filled pause) or the utterance of the filler (transition word), "eh . . . " (in English, "er- . . . "), like "onsei, eh . . . " (in English, "speech, er- . . . ") causes the system to display the complemented phrase "onsei hokan" (in English, "speech complementing"). When there are a plurality of complementary candidates, the system displays the candidates on the screen or produces synthesized audio response so that the user can select an appropriate candidate. When there is only one candidate, the system may request the user to confirm it or automatically complete the input.
(2) Speech Backward Complementing: Complementing Method Using Speech Wild Card In the second method, when the user utters a specific wild card key-word such as "nantoka- . . . " (in English, "so and so . . . ," or "something . . . ") intentionally producing a filled pause, the system assumes that the whole key word is a wild card (arbitrary character string), and complements the wild card portion by determining from the context.

For example, when the phrase, "speech complementing," is registered in the dictionary of a speech recognition system, if the user utters the key word with a filled pause, "so and so . . . complementing," a list of complementary candidates with the part of "so and so . . . " being replaced with appropriate character strings, for example, "speech complementing," "speech forward complementing," and "speech backward complementing," are displayed for the user's selection. When there are a plurality of complementary candidates, the system may display the candidates on the screen or produce synthesized voice response. And the user can select an appropriate candidate from the candidates. When there is only one candidate, the system may request the user to confirm it or automatically complete the input.

While speech complementing can be performed for various levels including word, phrase, and sentence, speech complementing for words using the filled pause method is explained hereunder. A word here is defined as that which is registered in the word dictionary (of a language model) of the speech recognition system; a phrase can also be registered as a single word in the word dictionary. Therefore, when a combination of family name and given name such as "utada hikaru" is registered as a word, the filled pause after the syllable, "da", of "utada" generates candidates including "utada hikaru".

Figure 1:
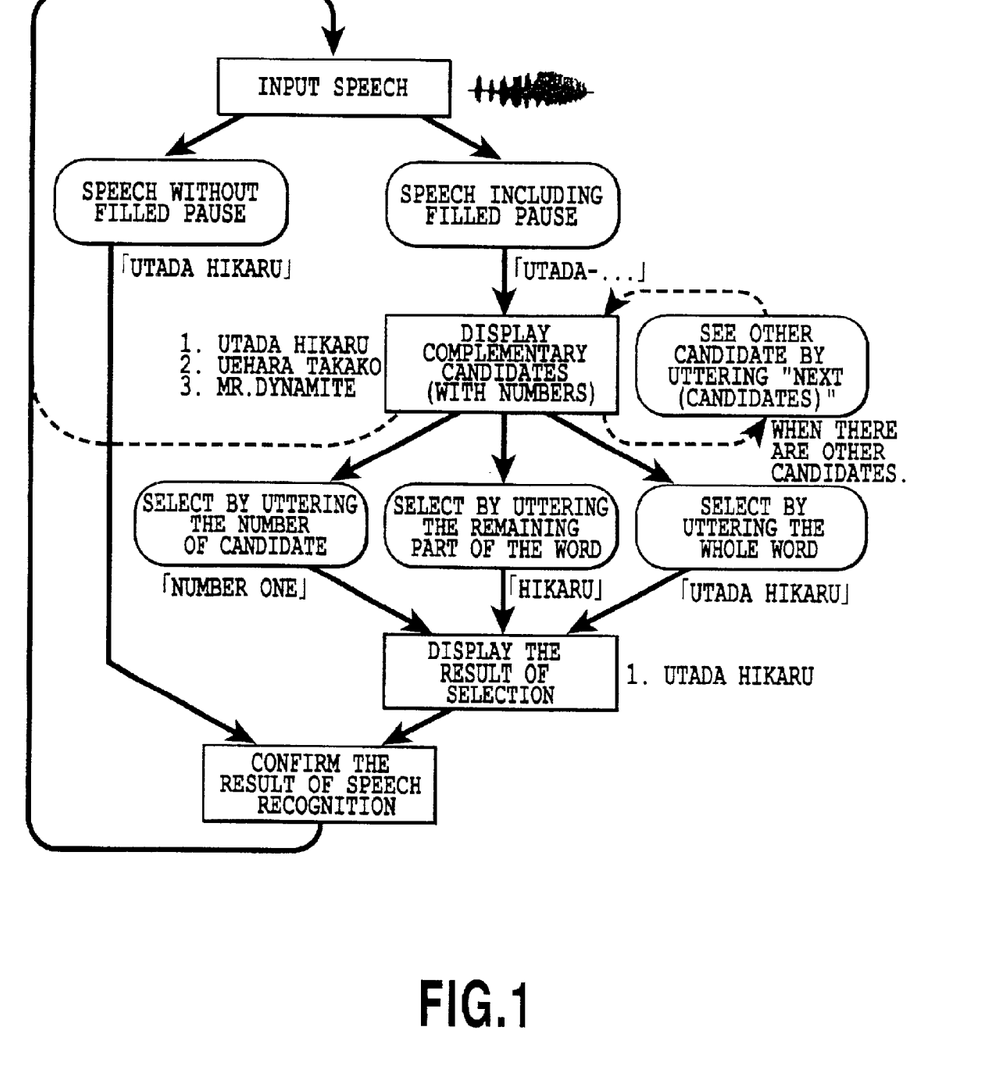
FIG. 1 is a flowchart that illustrates the speech complementing operation.

Referring to FIG. 1, the user can input a word, as described below, depending on the speech complementing that uses a filled pause.
1. When the user prolongs a vowel halfway during the utterance of a word, a list of complementary candidates (words) beginning with the portion that has been uttered is immediately displayed with numbers.

Figure 2:
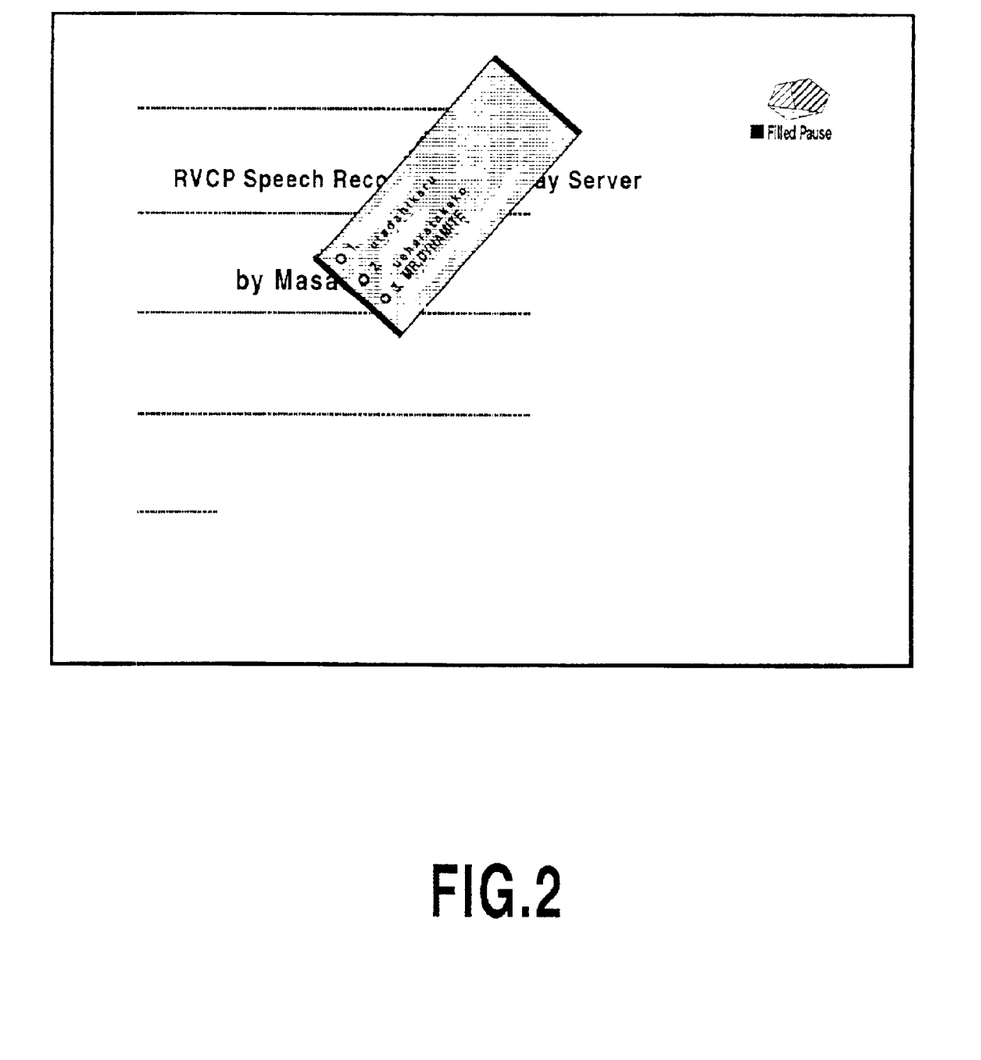
FIG. 2 shows a screen during the input of "utada-"("-" indicates a filled pause.)
Figure 3:
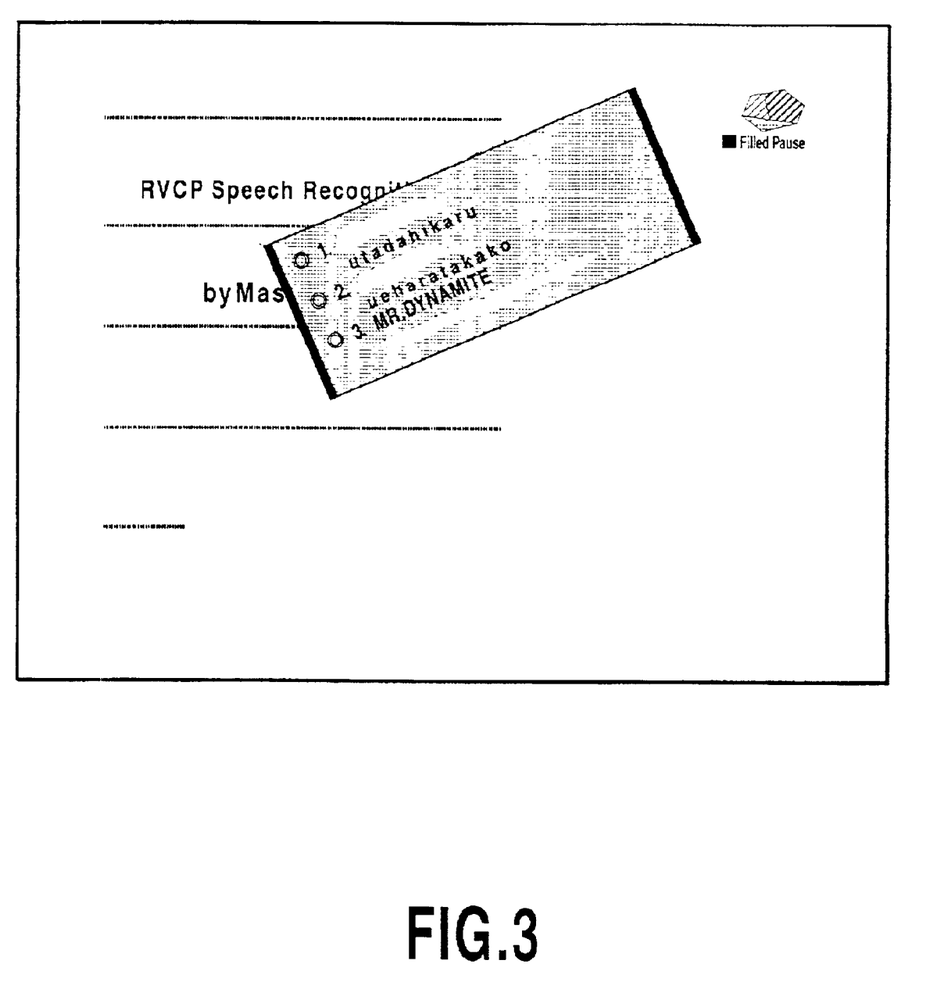
FIG. 3 shows the screen during the filled pause of "da-;"
Figure 4:
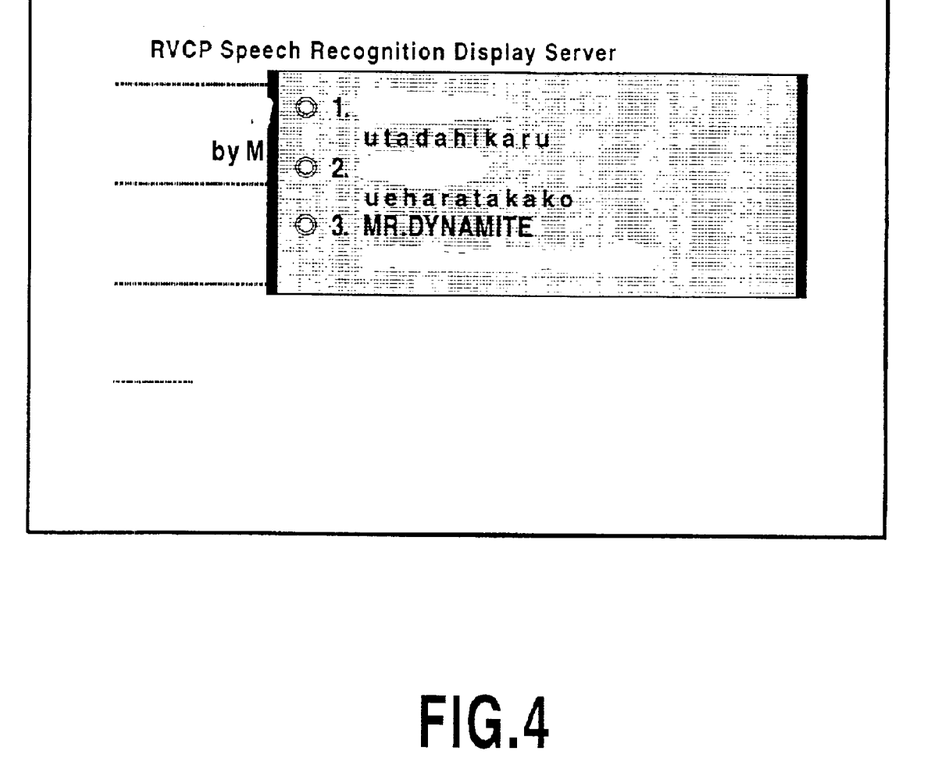
FIG. 4 shows a screen displaying the complementary candidates.
Figure 5:
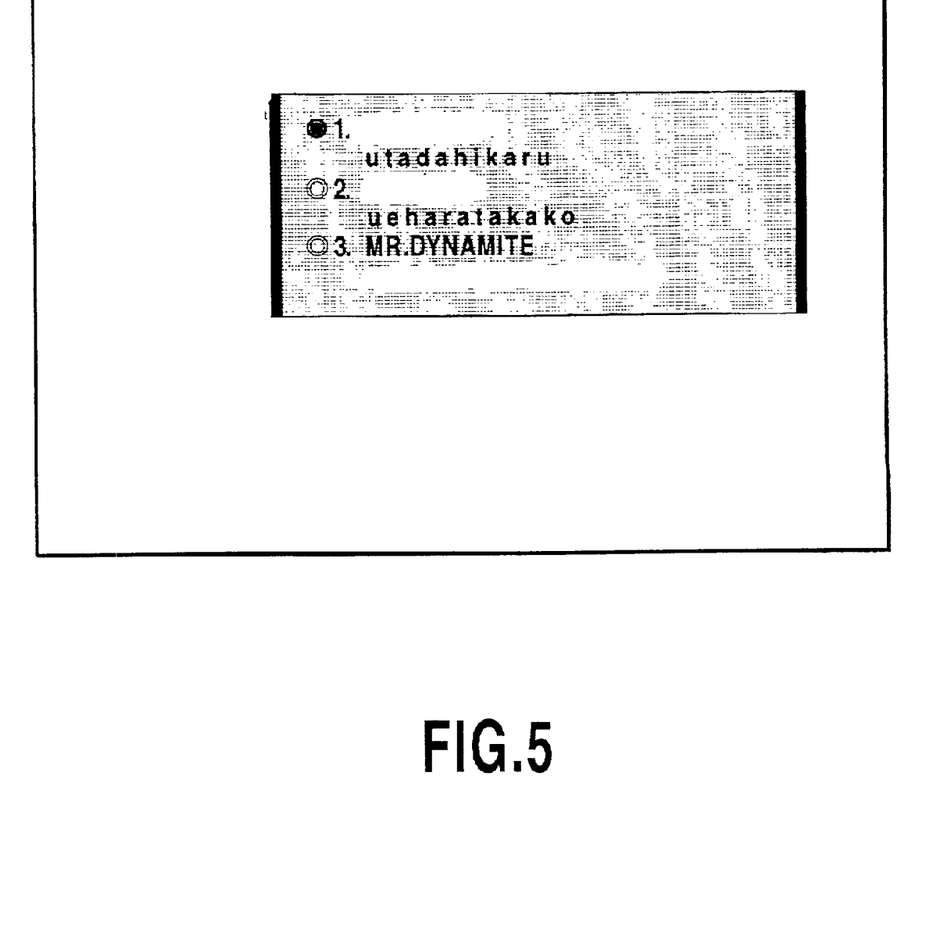
FIG. 5 shows a screen immediately after "No. 1" is inputted.

Referring to FIGS. 2 and 3, for example, when the user inputs "utada-," as shown in FIG. 4, complementary candidates are displayed as follows:
1. utada hikaru 2. uehara takako 3. MR.DYNAMITE
2. When the candidates are so many that all of them cannot be displayed on the screen, the mark, "Next candidates," is displayed. In such a case, the user can see other candidates by uttering the word or words, "next" or "next candidates". If there is no appropriate candidate or the user wants to input another word, the user can proceed to another utterance of speech without making selection in the following procedure 3 shown below.
3. The user can select one of the candidates seeing the list of candidates by one of the following four methods.
(a) The user selects a candidate by uttering a number of the candidates as shown in FIG. 5. (For example, by saying "number one" or "one.")
(b) The user selects a candidate by uttering the remaining part of the word. (For example, by saying "hikaru.")
(c) The user selects a candidate by uttering the whole word (For example, by saying "utada hikaru.").
(d) The user selects a candidate using some other device such as a keyboard, mouse, or touch panel.

Figure 6:
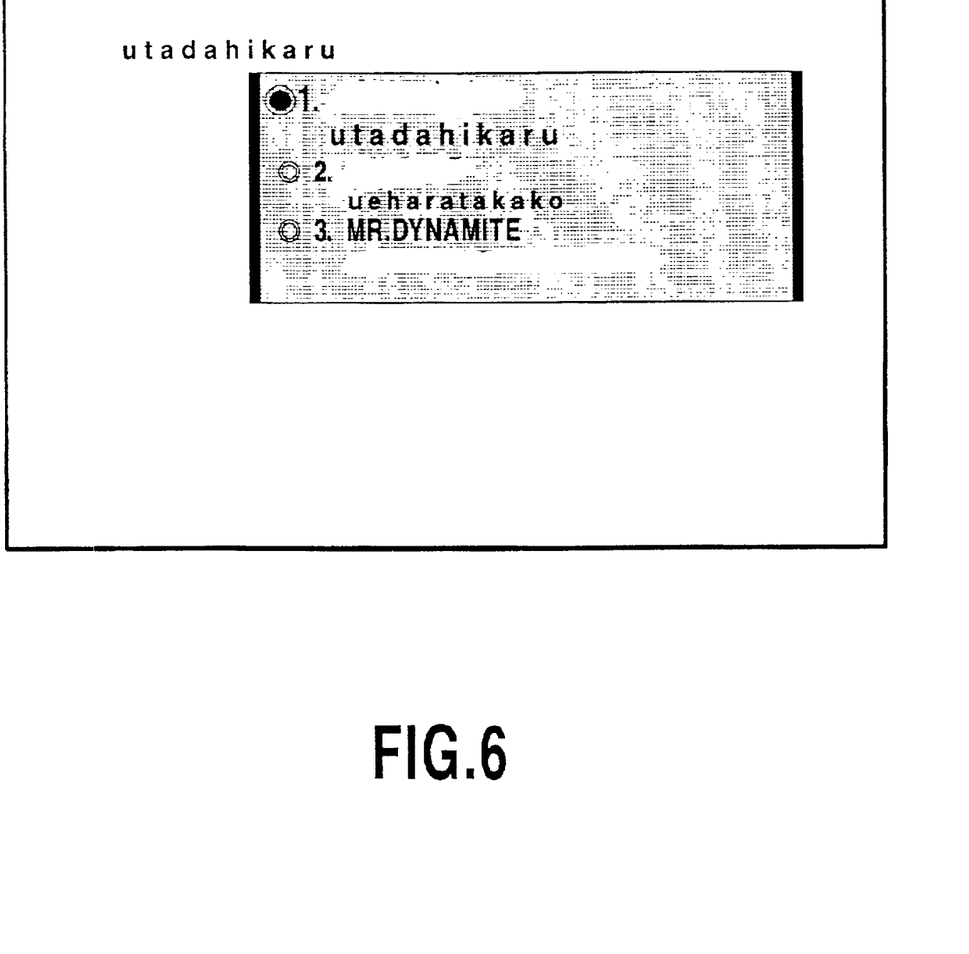
FIG. 6 shows a screen wherein the "No. 1" candidate is highlighted.
Figure 7:
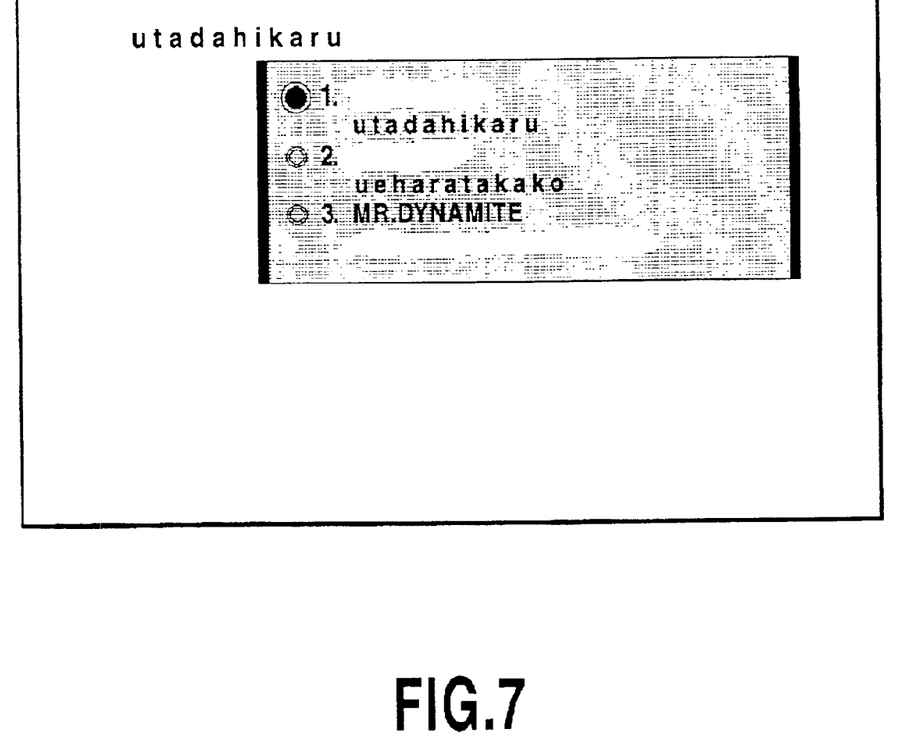
FIG. 7 shows a screen wherein the "No. 1" candidate is confirmed.

When a candidate is selected, it is highlighted as shown in FIG. 6, and it is confirmed as the result of the speech recognition as shown in FIG. 7.

In the speech complementing, it is possible to repeatedly call the candidates during the input of a word. For example, when inputting "Southern All Stars," the user can display the candidate list after saying "Southern- . . . ", and then display a narrowed down list after saying "All- . . . ", and finally the user can confirm by saying "Stars". It is necessary, as shown in this example, to arrange so that the complementary candidates are not called when the long vowel of "All" is uttered but they are called only when the intentional filled pause is made.

After a speech input interface system capable of speech complementing was actually constructed and operated, and it has been confirmed that the speech complementing practically functions enabling the user to perform interactive speech input by calling the complementary candidates. It has been proved that the speech complementing function requires no special training, and the interface is easy to use with intuitive operation. The speech complementing was particularly effective when inputting long words and phrases.

Although it has been confirmed in the test operation that the function is especially effective in inputting proper nouns such as names of songs and artists or addresses, it is also applicable immediately to other voice input applications for various systems.

According to the present invention, firstly, the function helps the user recollect. Even when the user wants to input something that he does not remember clearly, he can input it with the system's help by uttering a part of the word or words as much as he remembers.

According to the present invention, secondly, when the phrase being inputted is long and complicated, the user has only to utter a portion of the phrase that is enough for the system to identify the content of the phrase so that the system can complement and input the remaining.

Additionally, according to the present invention, the speech complementing system causes less mental resistance to use because input can be made by uttering a portion of a word, phrase, or sentence; whereas the most of conventional voice interfaces require the user to carefully utter the whole sounds to the last.

Figure 8:
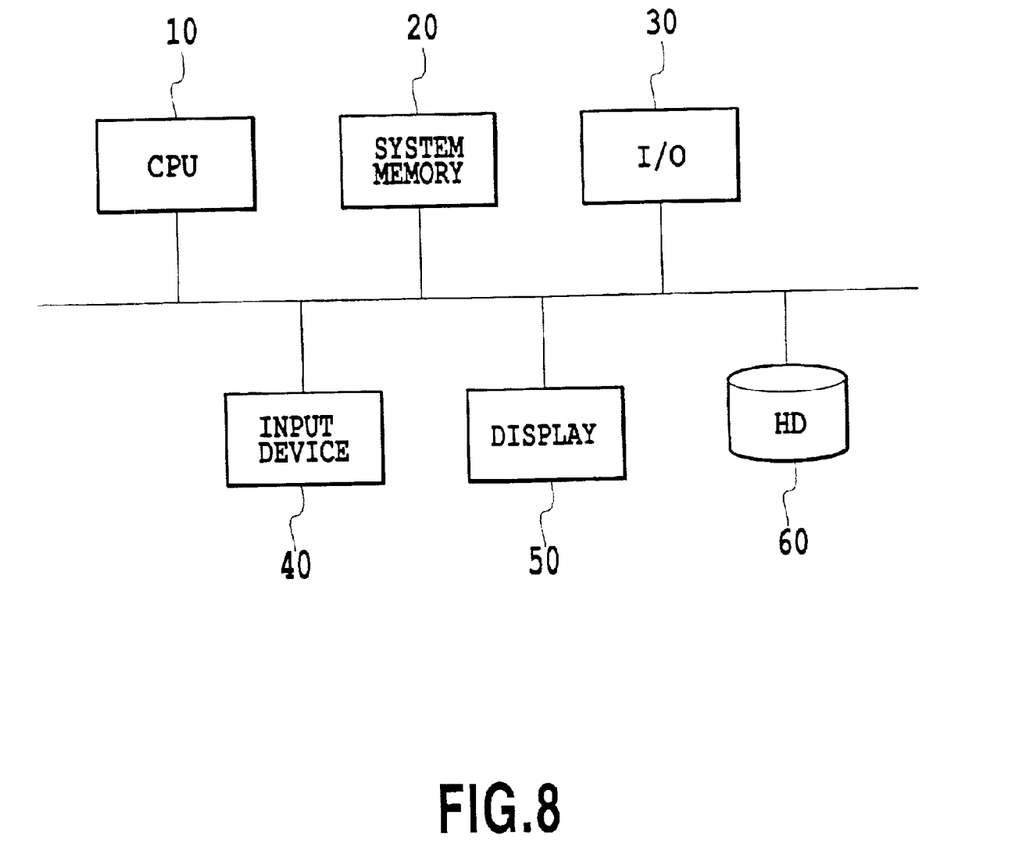
FIG. 8 is a block diagram that illustrates the system configuration of the speech complementing apparatus according to the present invention.

In FIG. 8, a preferred embodiment of the speech complementing apparatus based on the speech complimenting method according to the present invention is described hereunder.

Referring to FIG. 8, the speech complementing apparatus comprises a CPU 10, a system memory 20, an input/output (I/O) interface 30, an input device 40, a display 50, and a hard disk (HD) 60. Information processing devices, such as a personal computer, which are capable of executing programs may be used for the speech complementing apparatus.

The CPU 10 executes the program that is described below, which has been loaded in the system memory 20 to facilitate the speech complementing function. The system memory 20 has a RAM to store the program to be executed as well as to temporarily store the input/output data to the CPU 10.

The I/O 30 which is connected to a microphone (not shown) transmits the speech inputted from the microphone to the CPU 10. The input device 40 having a mouse, a keyboard or a touch panel instructs the operation of the CPU 10. The display 50 displays the inputted information from the input device 40 and the recognition results of the speech recognition processing which was executed by the CPU 10. The character strings complemented by the CPU 10 are also displayed. Furthermore, when there are a plurality of character strings that may be complemented, the plural sets of complementary character strings are displayed for the user to make the selection through the I/O 30 or the input device 40.

The hard disk 60 stores a speech recognition program with a speech complementing function, word dictionaries, a dictionary for operating an interface, data that are used by these programs for display, and other various data.

As the speech recognition program, an equivalent of an article on the market can be used. However, it needs to improve by adding the following complementing function.

When a filled pause period in the inputted speech is detected in the processing of the speech recognition, a list of complementary candidates is made. The processing for making the list of the complementary candidates is realized by extending the conventional program of a continuous speech recognition as described below.

Figure 10:
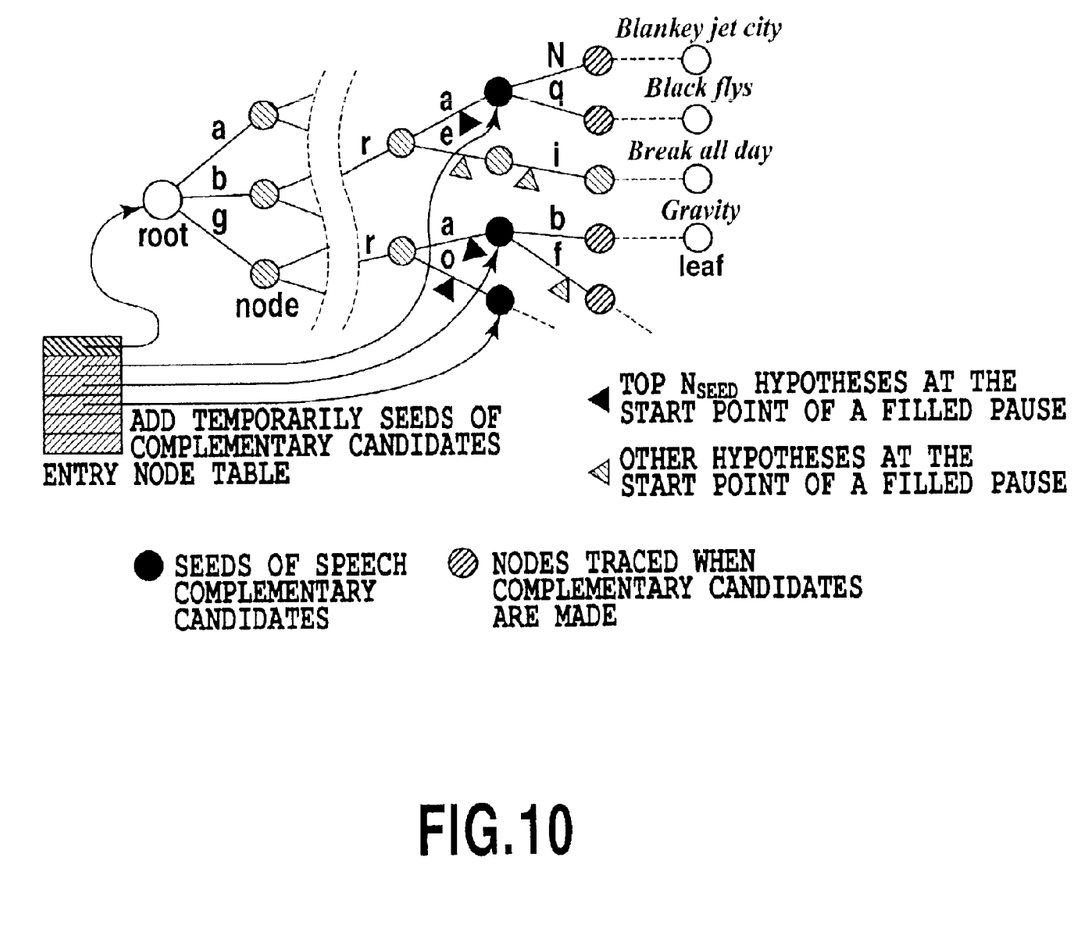
FIG. 10 is an illustration for explaining the speech complementing.

At that time, it needs not to include harmful effects for recognizing a normal speech which does not include a filled pause. Though complementing of a single-word utterance is described below, complementing words and phrases in a continuous speech input is also possible in the same framework. The system uses a word dictionary (person's names etc.) to be inputted, a dictionary of wild card key-words and a dictionary for operating an interface (candidate number and instructions for displaying other candidates etc.). The word dictionary has a tree structure as shown in FIG. 10. The recognition processing starts from the root of the dictionary and increases hypotheses corresponding to the branching frame by frame, tracing the nodes toward the leaves. The wedge marks represent hypotheses. When the filled pause is detected, whether the hypothesis with highest likelihood at this point is a wild card key-word or not is judged to determine which of speech forward complementing and speech backward complementing is executed.

In the case of the speech forward complementing, the generation of complementary candidates is realized by tracing from the effective top-$N_{seed}$ hypotheses at this point ($N_{seed}$ hypotheses from top in order of high likelihood) to the leaves. Those candidates are numbered in order of high likelihood to obtain top-$N_{choice}$ candidates.

The nodes corresponding to hypotheses used in the generation are referred to as seeds. For example, assuming that the uppermost black circle is a seed, complementary candidates are "Blankey jet city" and "Black flys". At the same time, it is checked how far in each candidate has been uttered by obtaining the phoneme string that has been recognized. In order to make it possible to select by uttering the remaining part of a word, after the user looked at the candidates, an entry node table is introduced for registering the root from which starts. Thereby, the recognition from the middle of a word is enabled. For the normal recognition starting from the top of a word, only the root of the word dictionary is registered. When the recognition from the middle of the word should be enabled for the candidate selection, the seed of each complementary candidate is added temporarily as a root (only the next utterance after the utterance with the filled pause). Although added entries are recognized by uttering only the remaining phoneme string after the filled pause, the result of the recognition is a whole word.

On the other hand, in the case of the speech backward complementing, a latter part of a word uttered after end point of the wild card key-word with the filled pause is recognized so as to generate candidates. This recognition from the middle of the word is realized by temporarily adding, to the entry node table, the syllables in the middle of all the words in the word dictionary (only just after a wild card key-word). Then the hypotheses which reached to leaves are numbered in order of high likelihood and $N_{choice}$ hypotheses from top are sent as complementary candidates. After that, in order to make it possible to select candidates by uttering the remaining first-half part of the word, the word in which end of the unuttered phoneme string of each candidate is a leaf is temporarily registered. For example, when "koyanagi yuki" is inputted in the form of the "something . . . yuki" (or "so and so . . . yuki"), the word in which the end of /koyanagi/ is a leaf is temporarily added to the word dictionary.

Figure 9:
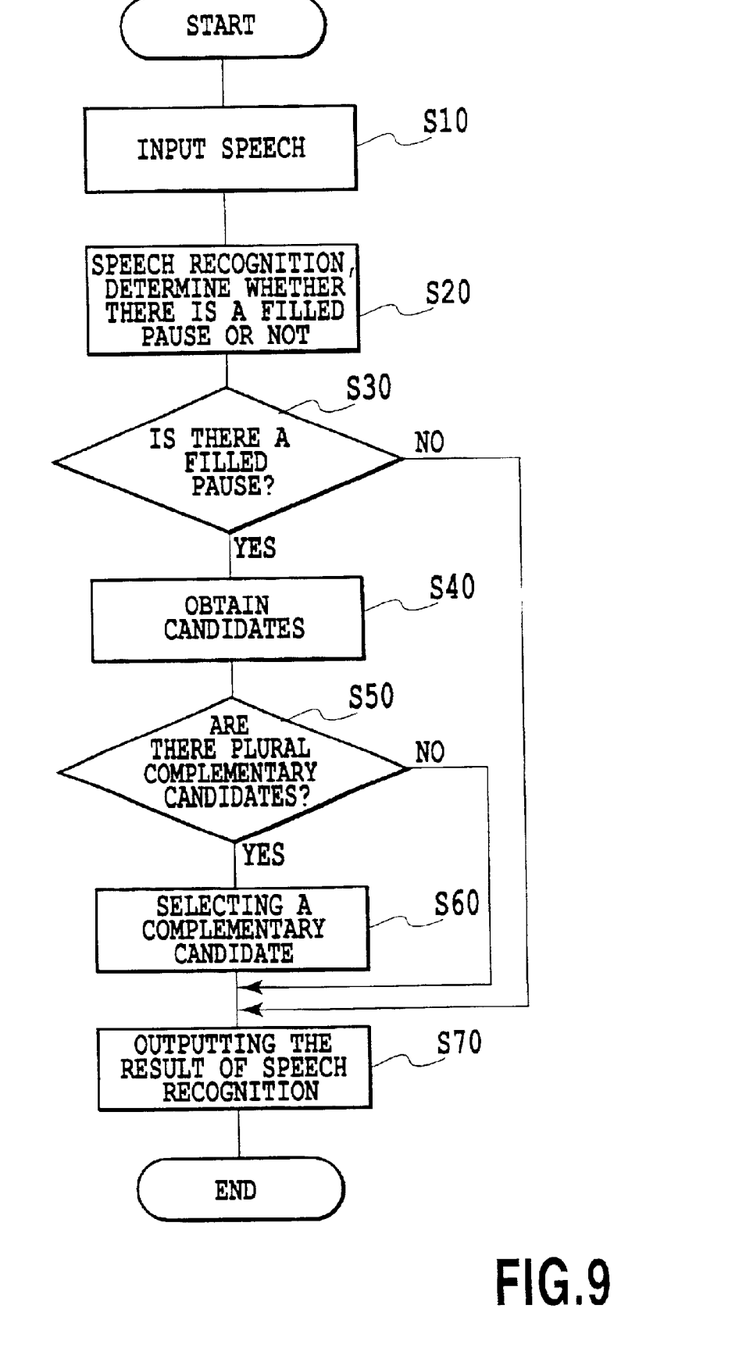
FIG. 9 is a flowchart that illustrates the speech complementing program.

Referring to FIG. 9, the operation of the speech complementing apparatus will be described as follows. FIG. 9 shows the content of the speech recognition program. The speech recognition program is loaded to the system memory 20 from the hard disk 60 according to the instruction from the input device 40, and then executed by the CPU 10. When a speech is inputted from the microphone (not shown) through the I/O 30, the CPU 10 temporarily stores the speech in the form of digital signal in the system memory 20 (step S10). At this time, the CPU checks the inputted speech to detect a period of the filled pause (prolongation of vowels and a continuous voiced sound) by using a method disclosed in Japanese patent application No. 11-305768 (1999).

When the period of the filled pause is detected, speech recognizing and complementing of the speech data which has been stored in the system memory 20 are executed by using the speech recognition program (step S30). The result of speech recognition is obtained by generating a number of hypotheses of phoneme strings based on the word dictionary and the grammar and by evaluating the likelihood of those hypotheses in order to obtain appropriate results from top in order of high likelihood.

In parallel with such processing, the CPU 10 is always judging whether or not there is a filled pause. When the existence of the filled pause is not detected, the process proceeds along steps S30 and S70 and then the result of the speech recognition obtained is outputted.

The complementary candidates are displayed on the screen of the display 50. The user selects suitable one in the complementary candidates by using a speech, the mouse or the touch panel (step S60). When the number of the candidates is one, it is possible to wait for selection for confirming by the user and automatic selection (decision) may be allowable. The selected candidate is decided as the final result of complementing. The result of complementing is also outputted as the result of the speech recognition (step S70).

In addition to the embodiment described above, the following embodiments are also possible:

1) The output units for the complemented speech recognition results can include, in addition to the display, a printer, a speaker for synthesized voice output, a communication device to other computers, and a drive that writes information in recording medium such as a floppy disk.

When synthesized voice is output from the speaker, the voice may be synthesized based on the character strings resulting from the speech recognition using a conventional voice-synthesizing program.

Furthermore, when there are a plurality of complementary character strings, the selective candidates may be informed to the user using the synthesized voice. In such a case, the user may input the selection by speech input as well as by the input device 40. When the speech input is used, the CPU 10 recognizes the input speech and identifies the complementary character string that has been selected by the user based on the speech recognition results.

2) The speech complementing apparatus may utilize any equipment such as an IC chip, a cellular phone, a personal computer, and other information processing devices.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A speech complementing apparatus comprising:

means for repeatedly and continuously detecting whether or not there is filled pause in a user's speech, wherein said filled pause is a trigger for complementing;

means for recognizing said user's speech in parallel with said detecting whether or not there is said filled pause;

means for complementing a language part to the fragment of the language spoken by the user when said filled pause is detected by said means for detecting; and means for outputting a result of recognizing by said means for recognizing when no filled pause was detected.

2. The speech complementing apparatus as claimed in claim 1, wherein said means for complementing complements said language part after said filled pause with a clue, which is a fragment before said filled pause of the speech, when said filled pause was detected.

3. The speech complementing apparatus as claimed in claim 1, wherein said means for complimenting considers a specified key-word as a specified string to replace a specific key-word based on a relation of words around the specific key-word, when responding to said specific key-word including said filled pause.

4. The speech complementing apparatus as claimed in claim 3, further comprising:

output means for outputting a list of candidates for complementing when there are a plurality of candidates for complementing; and input receiving means for receiving a selection from the user of said plurality of candidates, wherein when there is only one candidate, the apparatus performs one of: asking the user's confirmation with said output means, or inputting automatically the one candidate.

5. A speech complementing method wherein a system recognizes a user's speech, said method comprising:

(a) detecting repeatedly and continuously whether or not there is a filled pause in the user's speech, wherein said filled pause is a trigger for complementing;

(b) recognizing said user's speech in parallel with (a);

(c) complementing a language part to a fragment of the language spoke by the user by said system when said filled pause is detected; and (d) outputting a result of said recognizing when no filled pause is detected.

6. The speech complementing method as claimed in claim 5, wherein (c) comprises complementing the language part following said filled pause with a clue which is a fragment of the user's speech occurring before said filled pause.

7. The speech complementing method as claimed in claim 5, wherein responding to a specific key-word including said filled pause, the specified key-word is considered as a specified string to replace the specific key-word based on a relation of around the specific key-word.

8. The speech complementing method as claimed in claim 5, wherein (c) further comprises:

outputting a list of the candidates for complementing to a screen or in audio form, when there are a plurality of candidates for complementing;

receiving a selection of said plurality of candidates from said user; and when there is only one candidate, performing one of: asking confirmation of said only one candidate from said user, or inputting said only one candidate automatically.

9. The speech complementing method as claimed in claim 8, further comprising:

selecting a remaining part, wherein the system complemented the part of a fragment of a language spoken by the user, after the system displays the list of the candidates for complementing and when the user selects the plurality of candidates for complementing, by recognizing a speech spoken to read by the user.

10. The speech complementing method as claimed in claim 5, further comprising:

generating a candidate of speech forward complementing dynamically by tracing toward leaves of a word dictionary of a tree structure, considering an effective hypothesis as a seed.

11. The speech complementing method as claimed in claim 10, wherein said system comprises a word dictionary of a tree structure and a entry node table, and wherein the method further comprises:

registering a root from which said recognizing starts in said entry node table;

adding a seed of a candidate for complementing temporarily to said entry node table, wherein said seed is used when said candidate for complementing is generated, as a root, selection of the plurality of candidates for complementing by uttering a latter part of a word is made possible.

12. The speech complementing method as claimed in claim 5, further comprising:

recognizing from a middle of a spoken word; and speech-backward complementing based on the result of said recognizing.

13. The speech complementing method as claimed in claim 12, wherein said system comprises a word dictionary of a tree structure and an entry node table, and wherein the method further comprises:

registering a root from which said recognizing starts in said entry node table;

adding syllables of words in said word dictionary temporarily to said entry node table;

obtaining highest hypotheses from the hypotheses which reach to leaves of said tree structure and are numbered in order of high likelihood so that the highest hypotheses obtained become candidates of complementing for said speech backward complementing.

14. The speech complementing method as claimed in claim 12, wherein said system comprises a word dictionary of a tree structure and a entry node table, and wherein the method further comprises:

registering a root from which said recognizing starts in said entry node table;

selecting candidates for complementing when a top of a word is uttered by the user by registering words temporarily on said word dictionary, wherein said words to be registered are ones in which the end of an unuttered phoneme string of each candidate is a leaf.

15. The speech complementing method as claimed in claim 5, further comprising:

presenting a plurality of candidates for complementing to a user;

accepting a selection of a user to complement by the selected candidate for complementing; and automatically complementing with a candidate when a number of candidates for complementing is one.

16. The speech complementing method as claimed in claim 5, further comprising:

(e) determining whether or not a wild card key-word is included in the result of recognizing just before said filled pause when responding to detecting by (a);

(f) executing speech backward complementing when said filled pause is present; and (g) executing speech forwarding complementing when said filled pause is not present.

17. A recording medium which stores a program executed in a complementing apparatus, said program comprising:

a speech input step for inputting a speech;

a first detecting step for detecting repeatedly and continuously whether or not there is a filled pause in the inputted speech;

a recognizing step for recognizing said user's speech in parallel with said first detecting step, wherein a recognition result is generated;

a second detecting step for detecting a word fragment being a base to be complemented in said recognition result when there is the filled pause in said first detecting step;

a complementing step for complementing said recognition result, based on the detected word fragment;

an outputting step for outputting said recognition result when no filled pause was detected.

18. The recording medium as claimed in claim 17, wherein in said second detecting step, the word fragment is specified by detecting a period of the filled pause in the speech inputted in said speech input step.

19. The recording medium as claimed in claim 18, wherein said word fragment is said recognition result before said period of the filled pause.

20. The recording medium as claimed in claim 17, wherein in said second detecting step, said word fragment is specified by detecting a predetermined string in the result of recognizing in said recognizing step.

21. The recording medium as claimed in claim 20, wherein said word fragment is the result of recognizing after said predetermined string.

22. The recording medium as claimed in claim 17, further comprising:

a selecting step for selecting a candidate for complementing if there are the plurality of candidates when said word fragment is complimented by said complementing step.

* * * * *